(12) United States Patent
Lloyd et al.

(10) Patent No.: US 8,688,450 B2
(45) Date of Patent: Apr. 1, 2014

(54) DISAMBIGUATION OF CONTACT INFORMATION USING HISTORICAL AND CONTEXT DATA

(75) Inventors: Matthew I. Lloyd, Cambridge, MA (US); Willard Van Tuyl Rusch, II, Woodside, CA (US)

(73) Assignee: Google Inc., Mountain View, CA (US)

( * ) Notice: Subject to any disclaimer, the term of this patent is extended or adjusted under 35 U.S.C. 154(b) by 52 days.

(21) Appl. No.: 13/545,744

(22) Filed: Jul. 10, 2012

(65) Prior Publication Data

US 2012/0278076 A1 Nov. 1, 2012

Related U.S. Application Data

(63) Continuation of application No. 13/249,565, filed on Sep. 30, 2011, now Pat. No. 8,386,250, and a continuation of application No. 12/782,862, filed on May 19, 2010.

(51) Int. Cl.
*G10L 15/06* (2013.01)
*G10L 15/00* (2013.01)

(52) U.S. Cl.
USPC ............................ 704/244; 704/243; 704/231

(58) Field of Classification Search
USPC ............ 704/200, 231–256, 256.1–256.8, 257
See application file for complete search history.

(56) References Cited

U.S. PATENT DOCUMENTS

| | | | |
|---|---|---|---|
| 5,632,002 A | 5/1997 | Hashimoto et al. | |
| 5,950,157 A * | 9/1999 | Heck et al. | 704/234 |
| 6,532,444 B1 * | 3/2003 | Weber | 704/257 |
| 6,553,345 B1 * | 4/2003 | Kuhn et al. | 704/275 |
| 6,574,599 B1 | 6/2003 | Lim et al. | |
| 6,704,707 B2 * | 3/2004 | Anderson et al. | 704/231 |
| 6,760,704 B1 * | 7/2004 | Bennett | 704/270 |
| 6,985,862 B2 * | 1/2006 | Strom et al. | 704/255 |
| 7,203,644 B2 * | 4/2007 | Anderson et al. | 704/243 |
| 7,523,012 B2 * | 4/2009 | Shah et al. | 702/150 |
| 7,526,431 B2 | 4/2009 | Roth et al. | |
| 8,009,678 B2 | 8/2011 | Brooke | |
| 8,060,373 B2 | 11/2011 | Gibbon et al. | |
| 2004/0043758 A1 | 3/2004 | Sorvari et al. | |
| 2004/0268162 A1 * | 12/2004 | Morisawa | 713/300 |

(Continued)

FOREIGN PATENT DOCUMENTS

EP 1895748 5/2008

OTHER PUBLICATIONS

Authorized Officer I. Barabasz. International Search Report and Written Opinion from related PCT Application No. PCT/US2011/036984, dated Aug. 31, 2011, 15 pages.

(Continued)

*Primary Examiner* — Jesse Pullias
(74) *Attorney, Agent, or Firm* — Fish & Richardson P.C.

(57) ABSTRACT

Methods, systems, and apparatus, including computer programs encoded on a computer storage medium, for disambiguating contact information are described. A method includes determining, for each of multiple communications that were initiated by a user of a mobile device, a time when the communication was initiated or received; determining, for each of multiple contacts associated with the user, a probability associated with the contact based at least on the times when the communications were initiated or received; weighting a contact disambiguation grammar according to the probabilities; and processing audio data using the contact disambiguation grammar to select a particular contact.

20 Claims, 3 Drawing Sheets

(56) References Cited

U.S. PATENT DOCUMENTS

| | | |
|---|---|---|
| 2005/0204009 A1 | 9/2005 | Hazarika et al. |
| 2005/0246325 A1 | 11/2005 | Pettinati et al. |
| 2006/0009974 A1 | 1/2006 | Junqua et al. |
| 2006/0035632 A1 | 2/2006 | Sorvari et al. |
| 2007/0060114 A1 | 3/2007 | Ramer et al. |
| 2009/0037413 A1 | 2/2009 | Castell et al. |

OTHER PUBLICATIONS

International Preliminary Report and Written Opinion from related PCT Application No. PCT/US2011/036984, dated Nov. 29, 2012, 9 pages.
Examination Report; Dec. 17, 2013; Australia; 2011255614; 3 pages.

* cited by examiner

DISAMBIGUATION OF CONTACT INFORMATION USING HISTORICAL AND CONTEXT DATA

CROSS-REFERENCE TO RELATED APPLICATIONS

This application is a continuation of U.S. patent application Ser. No. 13/249,565, filed Sep. 30, 2011, titled "DISAMBIGUATION OF CONTACT INFORMATION USING HISTORICAL DATA," which is a continuation of U.S. patent application Ser. No. 12/782,862, filed May 19, 2010, titled "DISAMBIGUATION OF CONTACT INFORMATION USING HISTORICAL DATA." The entire contents of the prior applications are hereby incorporated by reference.

BACKGROUND

This specification relates to speech recognition.

A user of a mobile device may provide input by, for example, typing on a keyboard or speaking into a microphone. When the user attempts to initiate a telephone call using voice dialing, the mobile device may dial the wrong contact if different contacts have similar sounding names, or if the user fails to specify a particular address or location associated with a contact.

SUMMARY

When a user of a mobile device speaks the name of a contact to initiate communication with another person, their utterance must generally be disambiguated in at least two dimensions. Disambiguation in the first dimension, referred to by this specification as the "quality of recognition" dimension, involves matching the sounds of the utterance to terms that the speaker may have spoken. In one example, disambiguation in the quality of recognition dimension may involve determining whether, when the speaker spoke an utterance that is phonetically transcribed as "call pill," they intended to say "call Bill," or "call Phil."

Disambiguation in the second dimension, referred to by this specification as the "speaker intent" dimension, relates to determining what the speaker may have intended when they spoke the utterance. For instance, if the speaker is assumed to have spoken the term "call Bill," disambiguation in the speaker intent dimension may involve determining which of multiple contacts named "Bill" that the user intended to call, or whether the speaker possibly intended to "call" a particular contact named "Bill" at home or at work.

An automated speech recognition ("ASR") engine may use a grammar that includes weighted transitions between nodes, such as a voice dialing grammar (or, more generally, a "communication initiation grammar") to disambiguate utterances in both the quality of recognition dimension and the speaker intent dimension. Combining the two above examples, and absent other context, an ASR engine may use a communication initiation grammar to determine whether the user intended to "call Bill at home" or "call Phil on his cell" when the utterance "call pill" was spoken.

Accordingly, one innovative aspect of the subject matter described in this specification may be embodied in methods that include the actions of estimating a probability that a user intends to initiate communication with a particular contact, or using a particular item of contact information. The probability may be estimated based on past interactions between the user and the particular contact, or based on past use of the particular item of contact information to initiate a communication with the contact. The estimated probability is used to modify the weights of transitions that are associated with the particular contact or with the particular contact information, in a communication initiation grammar.

Initially, as used by this specification, "contact information" (or "an item of contact information") may refer to any coded or uncoded representation of a recipient or destination of a communication, such as a telephone number, e-mail address, physical or mailing address, username, personal name, account name, screen name, instant messaging (IM) address, website name, or network address. A "communication" may refer to any synchronous or asynchronous conveyance or exchange of news, views, or information between two human or non-human entities, such as a message (e.g., an e-mail message, or an instant message), a document (e.g., an electronic file or physical mail), or a telephone call.

Furthermore, "initiating a communication," refers to an act or operation of directly or indirectly beginning, setting going, originating, generating, or starting a communication. In various contexts, initiating a communication may include dialing a telephone number, opening a blank or pre-addressed email message, or opening an instant messaging session, or causing a computer to perform these acts. For example, in other contexts, initiating a communication includes instructing a software application to perform an operation such as dialing a telephone number, addressing a blank email message, or opening an instant messaging session with a contact. When a communication is to be initiated using a particular item of contact information, such information can be passed to the software application, for example as metadata, with the instruction to perform a communication initiation operation. Passing the item of contact information as metadata obviates the need for the user to manually enter the contact information.

A "past interaction" with a contact may include a past initiated or consummated communication, or a past non-communicative act relating to the contact. For instance, a past interaction may occur when a user initiates or completes a phone call with a contact, or conducts a phone call that lasts more than a predetermined duration. Alternatively, a past interaction may occur when the user adds the contact to an address book, or reads or accesses content prepared by the contact, communicates with a third party about the contact, is assigned to a cluster of users that includes the contact, or is determined to be in within the physical proximity of the contact.

In general, another innovative aspect of the subject matter described in this specification may be embodied in methods that include the actions of receiving an audio signal, generating, for each of two or more items of contact information, an affinity score based on a frequency with which a user has previously communicated with a contact associated with the item of contact information, and further based on a recency of one or more past interactions between the user and the contact associated with the item of contact information, inferring, for each of the items of contact information, a probability that the user intends to initiate a communication using the item of contact information based on the affinity score generated for the item of contact information, generating a communication initiation grammar that includes one or more transitions associated with each of the items of contact information, where, for each of the items of contact information, the one or more transitions associated with the item of contact information are weighted according to the probability inferred for the item of contact information, performing speech recognition on the audio signal using the communication initiation grammar, to select a particular item of contact information, and initiating the communication using the particular item of contact information.

Other embodiments of this aspect include corresponding systems, apparatus, and computer programs, configured to perform the actions of the methods, encoded on computer storage devices.

These and other embodiments may each optionally include one or more of the following features. For instance, generating an affinity score based on a frequency with which a user has previously communicated with a contact associated with the item of contact information further includes determining a frequency with which the user has accepted a result of a voice dial speech recognition that has dialed the contact, and incrementing the affinity score based on the frequency with which the user has accepted the result of the voice dial speech recognition; generating an affinity score based on a frequency with which a user has previously communicated with a contact associated with the item of contact information further includes determining a frequency with which the user has manually dialed the contact, and incrementing the affinity score based on the frequency with which the user has manually dialed the contact; generating an affinity score based on a frequency with which a user has previously communicated with a contact associated with the item of contact information further includes determining a frequency with which the user has sent a Short Message Service (SMS) message to the contact or has received an SMS message from the contact, and incrementing the affinity score based on the frequency with which the user has sent an SMS message to the contact or has received an SMS message from the contact; generating an affinity score based on a frequency with which a user has previously communicated with a contact associated with the item of contact information further is determining a frequency with which the user has sent an e-mail message to the contact or has received an e-mail message from the contact, and incrementing the affinity score based on the frequency with which the user has sent an e-mail message to the contact or has received an e-mail message from the contact; generating an affinity score based on a recency of one or more past interactions between the user and the contact associated with the item of contact information further includes determining that the contact has been added to an address book of the user within a predetermined period of time, and incrementing the affinity score based on determining that the contact has been added to the address book of the user within a predetermined period of time; the actions include receiving data that references a current context associated with the user, receiving, for each of two or more past interactions between the user and the contact, data that references a context associated with the past interaction, comparing the current context associated with the user with the contexts associated with the past interactions, and selecting a subset of the two or more past interactions based on comparing the current context associated with the user with the contexts associated with the past interactions; the affinity scores are generated using the subset of the past interactions only; generating, for each of two or more items of contact information, an affinity score based on a frequency with which a user has previously communicated with a contact associated with the item of contact information further includes generating a first partial affinity score based on a frequency with which a user has previously communicated with a contact associated with the item of contact information using a first communications channel, generating a second partial affinity score based on a frequency with which the user has previously communicated with the contact associated with the item of contact information using a second communication channel, weighting the first partial affinity score and the second partial affinity score, and combining the weighted, first partial affinity score with the weighted, partial affinity score to generate the affinity score; generating, for each of two or more items of contact information, an affinity score based on a recency of one or more past interactions between the user and the contact associated with the item of contact information further includes applying an exponential decay function to data which references when the one or more past interactions between the user and the contact associated with the item of contact information occurred; generating, for each of two or more items of contact information, an affinity score based on a recency of one or more past interactions between the user and the contact associated with the item of contact information further includes selecting a subset of the one or more past interactions that have occurred within a predetermined period of time.

Particular embodiments of the subject matter described in this specification may be implemented to realize one or more of the following advantages. The accuracy of voice-initiated communication, such as voice dialing, may be improved, enhancing the user experience and increasing user satisfaction. A user's own past actions may be used to infer their future actions, thereby personalizing a predicted action. Speech recognition and other complex tasks may be performed at the server side, instead of on the client device, to allow for enhanced process optimization and to increase computational efficiency.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
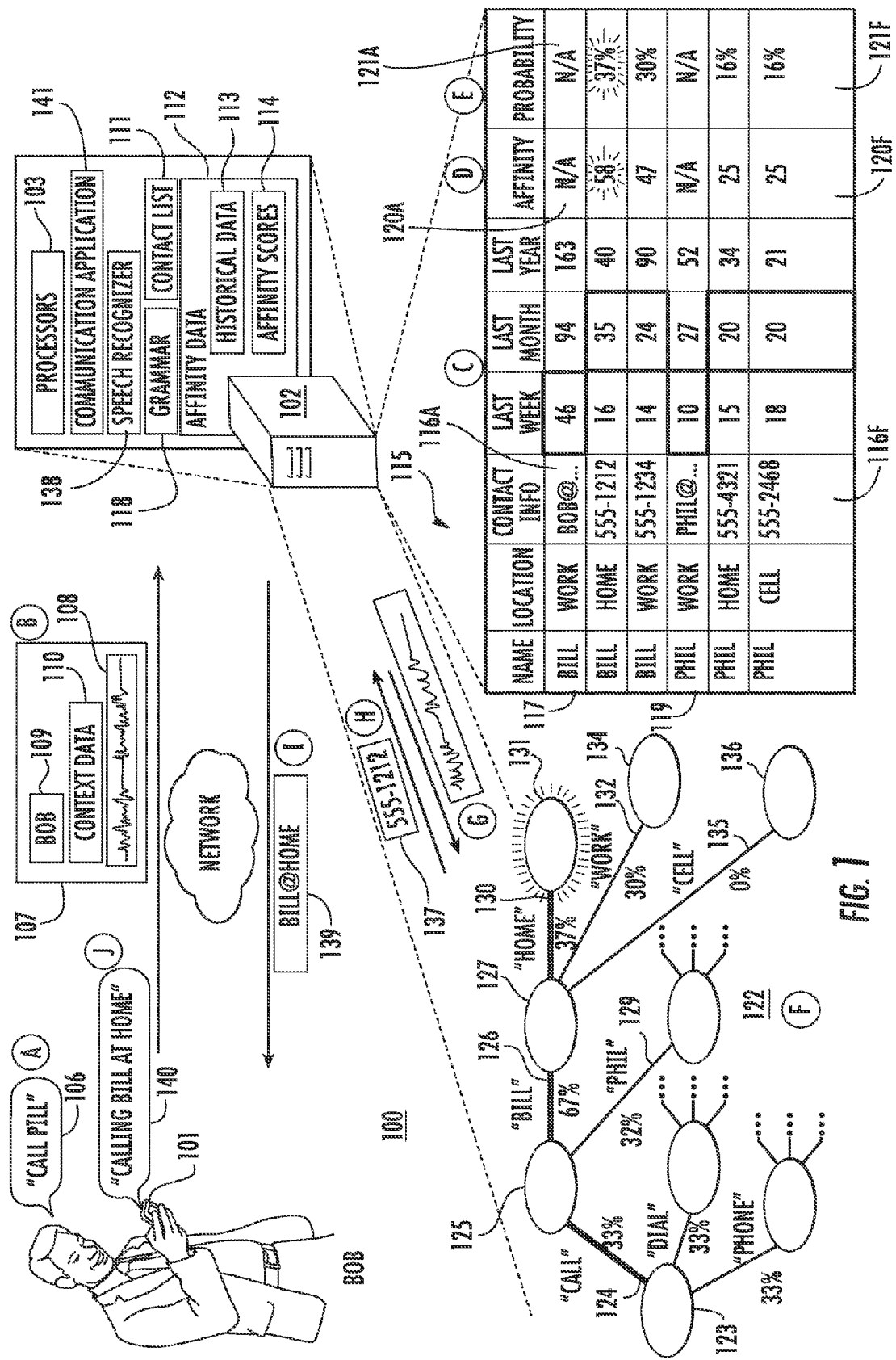
FIG. 1 is a diagram of an example system that uses historical data to disambiguate contact information referenced by a voice input.

FIG. 1 is a diagram of an example system 100 that uses historical data 113 to disambiguate contact information. In particular, the system 100 includes a mobile client communication device ("client device") 101 (e.g., a cellular telephone, a PDA, a personal computer, a music player, a tablet computer, e-book reader, or other processing device) and a server 102 (e.g., an ASR engine or 'speech recognizer' associated with a search engine, or another device that includes one or more processors 103), connected by way of one or more networks 104. FIG. 1 also depicts states (a) through (j), showing a flow of data that occurs when an example contact information disambiguation process is performed by the system 100.

Generally, the states (a) to (e) involve estimating a probability that a user 105 of the client device 101 will initiate a communication with (e.g., will "voice dial") one or more contacts in their contact list 111, and states (f) to (j) involve adjusting a speech recognizer to use these probabilities to disambiguate contact information more accurately. In practice, the states (a) to (j) may occur in the illustrated sequence, or they may occur in a sequence that is different than is illustrated.

During state (a), the user 105 of the client device 101 ("Bob") speaks an utterance 106 into a microphone of the client device 101, to instruct an application running on the client device 101 to initiate a communication with a contact in his contact list. The utterance 106 is phonetically transcribed as "call pill."

Depending on variables such as background noise or the accent of the user 105, the server 102 may interpret the utterance 106 as a voice command to initiate a telephone call with a contact named "Bill," using one of multiple phone numbers associated with contact "Bill," or a command to initiate a telephone call with a contact named "Phil," using one of multiple phone numbers associated with "Phil." Because the server 102 may generate multiple interpretations or transcriptions of the utterance 106, the server 102 must disambiguate the contact information to infer the intention of the user 105, before the server 102 can execute the voice command.

During state (b), data 107 is communicated from the client device 101 to the server 102 over the networks 104. The data 107 may include, for example, an audio signal 108 (or "audio file," "waveform" or "sample") that corresponds to the utterance 106. For example, the client device 101 may create a sound file or data stream by recording the utterance 106, and may send the sound file over the networks 104 during a communication session that is established between the client device 101 and the server 102. Instead of sending the audio signal 108 itself, the client device 101 may include information within the data 107 that references the audio signal 108 or the utterance 106 (e.g., a name of a file stored on the server 102, a hyperlink, or a unique identifier associated with the audio signal 108).

The data 107 may also include identification data 109 that uniquely identifies the user 105, or that identifies a cluster to which the user 105 is assigned, the client device 101, a type associated with the client device 101, or a type associated with a component (i.e., the audio sub-system) of the client device 101. The identification data 109 may be, for example, an alphanumeric user identifier, or a name of the user 105 or the client device 101.

The data 107 may also include context data 110 that describes a current context associated with the user 105 or the client device 101 at a time when the utterance 106 was spoken. The context data 110 may include an audio signal, such as a recording of ambient or environmental audio. In various examples, the context data 110 may reference a time and date when the utterance 106 was spoken, received or transmitted by the client device 101 (i.e., "Tuesday Noon"), may reference a location of the client device 101 when the utterance 106 was spoken, may reference the type of the client device 101 (i.e., "mobile") or the type of audio subsystem implemented by the client device 101, may reference whether the client device 101 was docked or holstered when the utterance 106 was spoken, received or transmitted by the client device 101, may reference whether the user 105 initiated an accept action or a cancel action when communication was automatically initiated with a particular contact or using particular contact information, may reference whether the user 105 chose an alternative recognition of the utterance 106 from an m-best list, or may reference whether the client device 101 as access to a WiFi connection.

During state (c), the server 102 uses the data 109 that uniquely identifies the user 105 to select the contact list 111, affinity data 112, and a optionally a communication initiation grammar 118 that are associated with the user 105. The contact list 111, affinity data 112, and grammar 118 associated with the user 105 may be selected from among multiple of contact lists, collections of affinity data, and grammars that are stored by the server 102.

The affinity data 112 may include historical data 113 about past interactions, (e.g., communications between the user and one or more contacts stored in the contact list 111, or of past interactions initiated by the user 105 with one or more items of contact information stored in the contact list 111, or non-communicative acts relating to the contacts or contact information). In addition to identifying successful and unsuccessful telephone call completions, the historical data 113 may also identify contact information that the user 105 has selected via manual initiation, contact information that the user 105 used to exchange text (SMS) messages, or contact information that the user 105 used to send email or other types of messages.

In further detail, the historical data 113 may identify times and dates associated with one or more past interactions initiated by the user, and/or weights and multipliers associated with the past interactions. The times and dates associated with the past interactions may be used to generate frequency and recency statistics, such as a frequency count of the number of past interactions that have occurred between the user 105 and a contact using a particular item of contact information within a specified period of time.

The weights that are associated with the past interactions in the historical data 113 may be assigned or generated based on the type or quality of each respective, past interaction. For instance, a high weight value may be associated with completed telephone call to a contact, and a low weight value may be associated with an uncompleted or attempted phone call. Similarly, a high weight value may be associated with an email where the contact was listed in the "to:" field, and a low weight value may be assigned to an email where the contact was merely "cc:'ed." Additionally, a higher weight (e.g., a value of five) may be associated with an IM session that lasts longer than a predetermined threshold duration, and a lower weight (e.g., a value of two) may be associated with an IM session that lasts shorter than the predetermined threshold duration.

A high weight value may also be associated with the action of adding a new contact to an address book, reflecting the notion that the user 105 is likely to initiate communication with a contact that they have just added. The weights may be stored in association with the past interaction in the historical data 113, or they may be dynamically generated, on-the-fly, in response to receiving the audio signal 108 or upon the occurrence of another event.

The multipliers that are associated with the past interactions may be used to adjust the effect that a frequency count has on an overall affinity score associated with the past interactions. For instance, and as described in more detail below, a zero-value multiplier may be applied to the frequency count for one or more past interactions that have occurred a long time ago, while a positive, non-zero multiplier may be applied to a frequency count for one or more past interactions that have occurred recently. The values used for the non-zero multiplier may exhibit a time-decaying effect.

In addition to time-based multipliers, context-based multipliers may be used to emphasize or deemphasize the effect that a frequency count may have on the overall affinity score for certain past interactions. For instance, a low-value multiplier (e.g., 10%) may be applied to a frequency count for one or more past interactions that have occurred in a context that the server 102 determines to be dissimilar, or quite dissimilar, to the current context of the user 105. Conversely, a high-value multiplier (e.g., 200%) may be applied to a frequency count for one or more past interactions that have occurred in a context that the server 102 determines to be similar or identical to the current context of the user 105. The multipliers associated with a past interaction may be stored in association with the past interaction in the historical data 113, or they may be dynamically generated, on-the-fly, in response to receiving the audio signal 108 or upon the occurrence of another event.

The affinity data 112 may also include current or past affinity scores 114 that have been generated for the contact information stored in the contact list 111. For instance, the affinity data 112 may include a 'running tally' affinity score for each respective item of contact information.

Table 115 provides one example visualization of the data that may be stored in the affinity data 112 on the server 102, and that may be used to generate affinity scores 120 and probabilities 121. Specifically, table 115 references several past interactions that have occurred when the user 105 initiated communication using contact information 116a to 116c for contact 117 ("Bill"), and when the user 105 initiated communication using the contact information 116d to 116f for contact 119 ("Phil"). The table 115 also includes a frequency count for each item of contact information 116 during three overlapping but different periods of time.

In more detail, the table 115 shows that the item of contact information 116a, a "work" email address for contact 117, was used to initiate communication with contact 117 forty-six times over the previous week, ninety-four times over the previous month, and one hundred sixty three times over the past year. The table 116 also shows that the item of contact information 116b, a "home" telephone number for the contact 117, was used to initiate communication with the contact 117 sixteen times over the previous week, thirty-five times over the previous month, and forty times over the past year. Moreover, the table 115 also shows that the item of contact information 116c, a "work" telephone number for contact 117, was used to initiate communication with the contact 117 fourteen times over the previous week, twenty-four times over the previous month, and ninety times over the past year.

The table 115 also shows that the item of contact information 116d, a "work" email address for contact 119, was used to initiate communication with contact 119 ten times over the previous week, twenty-seven times over the previous month, and fifty-two times over the past year. Furthermore, the table 115 shows that the item of contact information 116e, a "home" telephone number for the contact 119, was used to initiate communication with the contact 119 fifteen times over the previous week, twenty times over the previous month, and thirty-four times over the past year. Moreover, the table 115 shows that the item of contact information 116f, a "cell" telephone number for contact 119, was used to initiate communication with the contact 117 eighteen times over the previous week, twenty times over the previous month, and twenty-one times over the past year.

During state (d), the server 102 generates an affinity score for the items of contact information in the contact list 111 based at least on a frequency with which a user has previously communicated with a contact associated with the item of contact information, and on a recency of one or more past interactions between the user and the contact associated with the item of contact information. By generating an affinity score based on the extent to which a user has previously communicated with a contact, the server 102 is more likely to resolve voice dialing ambiguities in favor of contacts that the user communicates with most often, thereby improving the accuracy of voice dialing and enhancing the experience of the user 105.

As shown in table 115, the affinity scores 120 may be generated using only those past interactions that occur within a fixed duration, or "sliding window." For example, an affinity score may be generated using a weighted frequency count of telephone contacts within a previous month, augmented by a weighted frequency count for email communications to the same contact within a previous week. A sliding window may be applied to the historical data 113 by multiplying the respective frequency counts for those past interactions that do not occur within the fixed duration, by a zero-value multiplier. As shown in table 115, the server 102 calculates an affinity score 120b of fifty eight for contact information 116b, calculates an affinity score 120c of forty seven for contact information 116c, calculates an affinity score 120e of twenty five for contact information 116e, and calculates an affinity score 120f of twenty five for contact information 116f. Therefore, the contact information 116b is associated with the highest affinity score.

The affinity scores 120 correlate to the extent to which the user 105 has used a particular item of contact information to initiate communication with a contact in the past. For example, the affinity score 120b of fifty eight for the contact information 116b reflects that the user 105 has previously initiated communication using the contact information 116b to a greater extent than the user 105 has previously initiated communication using the contact information 116c, which has an affinity score 120c of forty seven. In other implementations where a different scoring system is used, a high affinity score may reflect that the user 105 has initiated context to a lesser extent than a low affinity score.

During state (e), the server 102 infers a probability that the user 105 intends to initiate a communication using each item of contact information. In some implementations, the probability is inferred based on the affinity score 120 generated for the respective item of contact information.

The server may infer the probabilities 121 using any number of different approaches. For instance, the probability for a particular item of contact information can be set to be proportional or inversely proportional to the affinity score 120, by multiplying or dividing all of the affinity scores 120 by a constant factor to generate the probability, such that the sum of all of the probabilities 121 adds up to 1.0. Alternatively, the probability for a particular item of contact information can be determined by dividing the affinity score for the particular item of contact information by the sum of all of the probability scores for all of the items of contact information in the address book. A Dirichlet distribution-based approach may also be used.

As shown in table 115, the server 102 infers a probability 121b of 37% for contact information 116b, infers a probability of 30% for contact information 116c, and infers probabilities 121e and 121f of 16% for each of contact information 116e and 116f. As would be expected, the contact information 116b is associated with the highest affinity score and, correspondingly, the highest probability.

During state (f), the server 102 generates a communication initiation grammar 122. Generating the communication initiation grammar 122 may include updating the communication initiation grammar 118 that was previously generated or selected for the user 105. The communication initiation grammar 122 specifies the legal sequences of words that the user can speak. For example, the grammar may allow sequences such as "call Bill at home" or "dial Phil," amongst others, but may disallow other sequences such as "order pizza," or "Bill should be called."

The communication initiation grammar 122 includes nodes and weighted transitions (e.g., transitions 124, 126, 129, 130, 132 and 135) between nodes. The transitions may be labeled with valid words (e.g., words that identify contacts, commands, or items of contact information), and the weights may reflect the probability that that word will follow in the sentence. In the communication initiation grammar 122, the weight associated with a transition for an item of contact information is set according the probability inferred by the server 102 for the item of contact information.

During state (g), a speech recognizer 138 on the server 102 performs a speech recognition on the audio signal 108 using the communication initiation grammar 122 and, during state (h), a particular item of contact information is selected. Specifically, the speech recognizer 138 starts at a start node 123 of the communication initiation grammar 122, and follows the first transition 124 ("call") to a first node 125.

The speech recognizer 138 then resolves the ambiguity between the contact names "Bill" and "Phil" by following the transition 125 ("Bill"), with a weight of sixty seven, to the second node 127, instead of following the transition 129 ("Phil"), with a weight of thirty two. Additionally, the speech recognizer 138 then resolves the ambiguity between the multiple items of contact information for contact "Bill" by following the transition 130 ("home"), with a weight of thirty seven, to the node 131, instead of following the transition 132, with a weight of thirty, to the node 134 and instead of following the transition 135, with a weight of zero, to the node 136. Even if the utterance 106 did not specify any further information after the contact name, the speech recognizer 138 would follow the transition 130 associated with the "home" location, since the transition 130 has the highest weight value among the transitions 130, 132, and 135.

Upon traversing the communication initiation grammar 121, the speech recognizer 138 outputs data 137 that identifies the contact information 116b as the contact information that was most likely intended by the user 105 when the user 105 spoke the utterance 106.

During state (i), communication is initiated using the selected item of contact information 116b. For example, the server 102 may send a message 139 that references the contact information 116 to the client device 101. The message 139 may instruct the client device 101 to initiate a communication using the item of contact information 116b.

During state (j), the client device 101 initiates the communication using the item of contact information 116b, and notifies the user, via spoken output 140, that the communication has been initiated. The communication may be initiated by a communication application 141 on the server.

Figure 2:
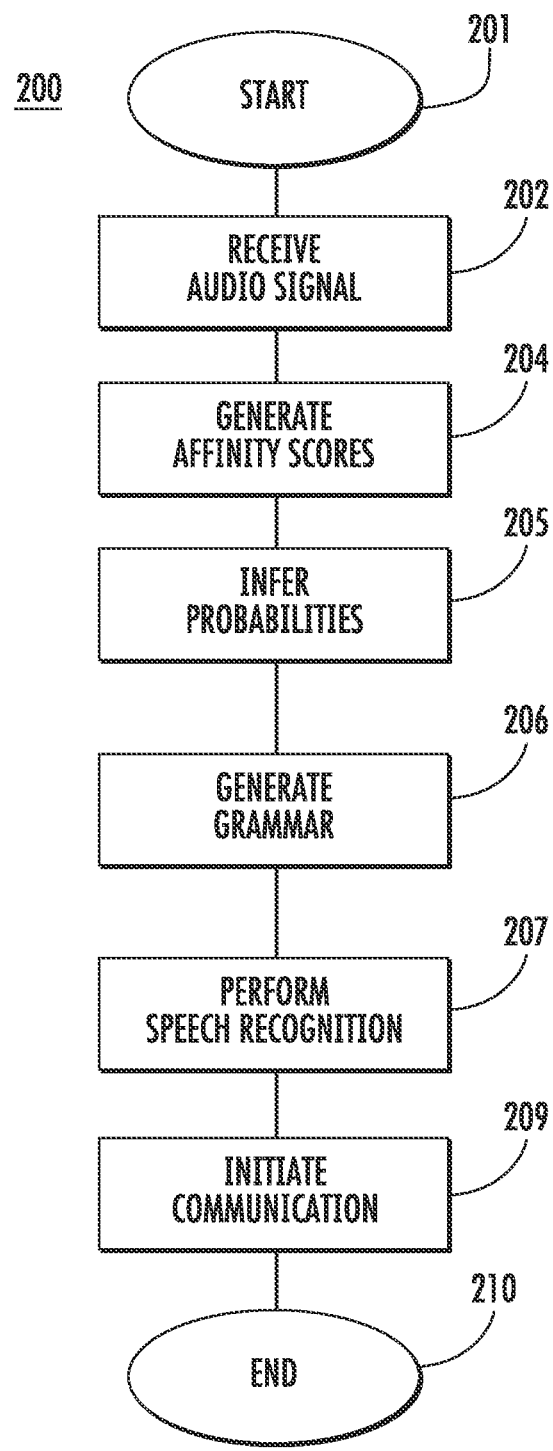
FIG. 2 is a flowchart of an exemplary process for disambiguating contact information.

FIG. 2 is a flowchart of an example process 200 for disambiguating contact information. Briefly, the process 200 includes receiving an audio signal, generating, for each of two or more items of contact information, an affinity score based on a frequency with which a user has previously communicated with a contact associated with the item of contact information, and further based on a recency of one or more past interactions between the user and the contact associated with the item of contact information, inferring, for each of the items of contact information, a probability that the user intends to initiate a communication using the item of contact information based on the affinity score generated for the item of contact information. The process 200 also includes generating a communication initiation grammar that includes one or more transitions associated with each of the items of contact information, where, for each of the items of contact information, the one or more transitions associated with the item of contact information are weighted according to the probability inferred for the item of contact information, performing speech recognition on the audio signal using the communication initiation grammar, to select a particular item of contact information, and initiating the communication using the particular item of contact information.

In further detail, when the process 200 begins (201), an audio signal is received (202). The audio signal may correspond to an utterance that is spoken as a voice input to a control, application, or voice input method editor ("IME") on a client device. In a voice dialing context, the audio signal may also include some additional information about the type of number that the user wants to call, such as "call Matthew Smith's mobile" or "call Matthew Smith at home".

While the audio signal may correspond to a voice dialing command, in other implementations, the user may intend to initiate another type of communication. For example, the audio signal may be recorded when a user of a client device instructs an application to compose and send another form of electronic communication (e.g., an e-mail, a fax, an instant message, a "friend request" or a social network "poke," or a text message).

The audio signal may be recorded when the user of the client device selects a control (e.g., a microphone icon) before speaking the utterance, speaks the utterance, then releases the control, thereby causing the client device to generate the audio signal and initiate the process 200. In another example, the microphone of the client device may already be "on" before the user speaks (e.g, using predictive recording), or may be in an "always-on" state (e.g., the user may simply speak without turning "on" the microphone). In addition to the utterance, other information, such as ambient or environmental audio, may also be recorded or encoded in the audio signal.

The audio signal may be received by a server, which may be a search engine, an ASR engine, a dictation engine, a dialogue system, or any other engine or system that uses transcribed speech, or that invokes a software application that uses transcribed speech, in performing any process. By sending the audio signal to the server, the client device may avoid having to perform the contact information disambiguation or speech recognition processes locally, reducing the processing requirements for the client device. In other example implementations, however, the speech recognition or contact information disambiguation processes may be performed by the client device, and an output of the speech recognition or the contact information disambiguation process may be further processed by the client device or communicated to the server. The audio signal may be communicated from the client device to the server over a public switched telephone network (PSTN), a wireless cellular network, a wireless local area network (WLAN) or Wi-Fi network, a Third Generation (3G) or Fourth Generation (4G) mobile telecommunications network, a private network such as an intranet, a public network such as the Internet, or any appropriate combination thereof.

An affinity score is generated for each of multiple items of contact information (204). The affinity score may be generated based on a frequency with which a user has previously communicated with a contact associated with the item of contact information, and/or based on a recency of one or more past interactions between the user and the contact associated with the item of contact information.

One approach for generating an affinity score is to apply an equal affinity score to each item of contact information. For instance, if there are N items of contact information in an address book, each item of contact information is given an affinity score of 1/N. This approach, however, does not benefit from the use of data which reflects the extent to which the particular item of contact information has been used to initiate contact in the past.

Another approach for generating an affinity score uses smoothed scoring based on frequency counts. For example, the frequency counts (e.g., quantity of dial events, call initiations, emails etc.) for each item of contact information may be weighted, scaled, or otherwise converted into affinity scores. While this approach does utilize the frequency counts, it does not factor in the recency of each past interaction in determining the affinity score. Accordingly, this approach may be less beneficial for users whose calling patterns change over time.

A third approach, referred to above as the sliding window approach, generates affinity scores by aggregating frequency counts for past interactions that have occurred within a predetermined period of time. For example, the quantity of communications that have recently been initiated using a particular item of contact information can be counted, and the quantity may be weighted and scaled to generate the affinity score. Such an approach uses both frequency and recency information to generate the affinity score, and may thus be useful for users whose calling patterns change over time.

A fourth approach for generating the affinity scores uses exponentially decaying frequency counts, with augmentation for new contacts. Using this approach, a running affinity score is kept for every contact in the user's contact list. When the user initiates communication with a contact, the frequency count is incremented, weighted and/or scaled, and the affinity score is incremented by the frequency count. Over time, the affinity score is continually scaled or reduced by an exponential decay factor (e.g. by multiplying the affinity score by 0.99 each day), so that contacts the user has not dialed in a long time have low affinity scores. Using this approach, newly added contact information can be immediately assigned a non-zero affinity score, to give that item of contact information a sufficient affinity score to indicate that the user is very likely to use this contact information soon to initiate communication with his new friend.

The affinity scores, or the historical data that is used to generate the affinity scores, may be made available to the server by the client device, or it may be retrieved by the server from the a third party (e.g., a cellular network provider). For example, the client device or the server can contact the user's email provider to request a latest version of the historical data.

Table 1 shows an example visualization of the historical data for a particular item of contact information ("Bob@Home"), as well as data that is used to generate affinity scores, using both the sliding window approach and the exponentially decaying frequency count approach. In practice, the data shown in Table 1 may reflect a small portion of the historical data, since the historical data for a user would likely reference past interactions that were initiated using other items of contact information, or other types of interactions that occurred with the contact "Bob." Accordingly, the data shown in Table 1 may represent a version of historical data that has been filtered to show past interactions that occurred using a single item of contact information, or that occurred using certain types of interactions only.

TABLE 1

Generating Affinity Scores Using "Sliding Window" and "Decaying Affinity"

| Date | Type | Contact | Completed? | Count | Wgt. | 1 week sliding Window | | Decaying Affinity (.9/day) | |
| --- | --- | --- | --- | --- | --- | --- | --- | --- | --- |
| | | | | | | Multiplier | Aff. Scr. Inc. | Multiplier | Aff. Scr. Inc. |
| 1-Jan | New | Bob@Home | Yes | 1 | 40 | 0 | 0 | 0.39 | 15.50 |
| 3-Jan | Call | Bob@Home | Yes | 1 | 5 | 0 | 0 | 0.48 | 2.39 |
| 3-Jan | Call | Bob@Home | No | 1 | 1 | 0 | 0 | 0.48 | 0.48 |
| 5-Jan | Call | Bob@Home | Yes | 1 | 5 | 1 | 5 | 0.59 | 2.95 |
| 6-Jan | Call | Bob@Home | Yes | 1 | 5 | 1 | 5 | 0.66 | 3.28 |
| 8-Jan | Call | Bob@Home | No | 1 | 1 | 1 | 1 | 0.81 | 0.81 |
| 10-Jan | Call | Bob@Home | Yes | 1 | 5 | 1 | 5 | 1.00 | 5.00 |
| | | | | | | Affinity Score on 10-Jan: | 16.0 | | 30.41 |

In Table 1, each row below the header row represents a past interaction that has occurred using the item of contact information "Bob at Home." This item of contact information is referenced in the third column.

The first column of Table 1 references the date of each past interaction, and the second column references the type of each past interaction. The "new" type relates to the act of adding the item of contact information to a user's contact list, and the "call" type relates to the initiation of a telephone call using the contact information. The fourth column, which references whether the past interaction was completed, is used to assign a weight for each past interaction, as described in more detail below.

As shown in the fifth column, each past interaction is associated with a frequency count value of "1," indicating that the past interaction represents one single communication. In other implementations, different frequency count values may be used, such as a frequency count value of "0" for an uncompleted call or a frequency count value of "2" for multiple calls that occur within a short period of time.

The weight that is assigned to each past interaction is shown in the sixth column of Table 1. Specifically, and regardless of which affinity score generation approach is used, a weight of "40" is assigned to the "new" type, to reflect the idea that the user is likely to initiate communication with a contact that they have just added. A "completed" call is assigned a weight value of "5," and an uncompleted call is assigned a weight value of "1." The weight values assigned to the different past interactions in Table 1 are exemplary only, and in other implementations different weight values may be used. For instance, no weight values may be assigned, or all past interactions for a particular item of contact information may use the same weight value.

When assigning weight values to a past interaction, higher weight values may be assigned to past interactions that were initiated through voice commands, since the distribution of communications is likely to be closer to what the user may have intended with a new utterance. For instance, if the user frequently voice dials a first contact and frequently types emails to a second contact, the server should resolve a voice dialing ambiguity between the two contacts in favor of the first contact since that communications with that contact are more heavily correlated with voice commands. This preference should hold true even if the quantity of interactions with the second contact significantly outnumbers the quantity of interactions with the first contact.

Further alternatively, higher weight values may be assigned to past interactions where the user took an action indicating that they were satisfied with the accuracy of a speech recognition result. Satisfaction may be measured by signals that indicate that the user clicked on a search result or manually selected a particular contact or a particular item of contact information from a list of suggested contacts or items of contact information.

Additionally, higher weight values may be assigned to one type of interaction over another type of interaction. For instance, if the user frequently calls a first contact, and frequently emails to a second contact, the server should resolve a voice dialing ambiguity between the contacts in favor of the first contact, since a past call may reflect the existence of a stronger interpersonal relationship than an email. Lower weight values may be assigned to email interactions where the contact is not listed in the "to:" field of the email.

The client device may monitor voice dial events that lead to successful call completion (i.e. the user accepts the result of the voice dial recognition and dials the contact), and may send data identifying these successful voice dial events to the server so that the weight values can be assigned. The affinity data may be stored on the client device or on the server, however, to better ensure privacy, uniquely assigned identifiers can be used to refer to contacts in the user's contact list, rather than the contact names themselves.

Using either the sliding window approach and the exponentially decaying frequency count approach, the affinity score for a particular item of contact information is generated by combining the frequency count for the item of contact information. For instance, the number of past interactions of a certain type may be added together, different types of communications may be weighted differently before being added together, and/or frequency counts may be scaled by multipliers to give more effect to one type of communication over another or that give more effect to recent communication over older communications.

In the example shown in Table 1, the sliding window approach uses a one week sliding window. To enforce this time restriction, a zero-value multiplier is applied (in the seventh column) to past interactions that have occurred more than one week before the current date (and are thus outside of the sliding window), and a non-zero-value multiplier is applied to past interactions that have occurred within the past week (and are thus inside the sliding window). For an affinity score that is generated on January 10, for example, a zero-value multiplier is applied to the past interactions that occurred on January 1 and January 3, and a "1" multiplier is applied to past interactions that occurred on or after January 4.

To generate the affinity score for the contact information "Bob@Home," the frequency count for each past interaction (fifth column) is multiplied by the associated weight (sixth column), and the result of that mathematical operation is multiplied by the "sliding window" multiplier (seventh column) to generate an affinity score increment (eighth column). For instance, the frequency count ("1"), weight ("40"), and multiplier ("0") for the first past interaction are combined to generate an affinity score increment (or "partial affinity score") of "0." Additionally, the frequency count ("1"), weight ("5") and multiplier ("1") for the seventh past interaction are combined to generate an affinity score increment of "5." The affinity score increments for all of the past interactions are summed to generate the affinity score. In Table 1, for example, an affinity score of "16" is generated for the contact information "Bob@Home," using the sliding window approach.

Using the exponentially decaying frequency count approach, the weighted frequency count for each past interaction is scaled according to an exponential decay multiplier, which in Table 1 is "0.9" for each day in the past. For instance, for an affinity score generated on January 10, an exponential decay multiplier of "1" (or "$0.9^0$") would be applied to the frequency count of any past interaction that occurred on that same day, an exponential decay multiplier of "0.81," (or "$0.9^2$") would be applied to the frequency count of any past interaction that occurred two days ago, an exponential decay multiplier of "0.48" (or "$0.9^7$") would be applied to the frequency count of any past interaction that occurred seven days ago, and so on.

To generate the affinity score for the contact information "Bob@Home," the frequency count for each past interaction (fifth column) is multiplied by the associated weight (sixth column), and the result of that mathematical operation is multiplied by the "decaying affinity" multiplier (ninth column) to generate an affinity score increment (tenth column). For instance, the frequency count ("1"), weight ("40"), and multiplier ("0.39") for the first past interaction are combined to generate an affinity score increment of "15.50." Additionally, the frequency count ("1"), weight ("5") and multiplier ("1") for the seventh past interaction are combined to generate an affinity score increment of "5.00." The affinity score increments for all of the past interactions are summed to generate the affinity score. In Table 1, for example, an affinity score of "30.41" is generated for the contact information "Bob@Home," using the exponentially decaying frequency count approach.

A probability is inferred for each of the items of contact information (205). The probability may be based on the affinity score generated for the item of contact information, and may reflect a likelihood that the user intends to initiate a communication using each item of contact information. The probability for a particular item of contact information can be set to be proportional to the affinity score by multiplying all of the affinity scores by a constant factor to generate the probability, such that the sum of all of the probabilities adds up to "1.0". Alternatively, the probability for a particular item of contact information can be determined by dividing the affinity score for the particular item of contact information by the sum of all of the probability scores for all of the items of contact information in the address book.

The probabilities may also be determined using a Dirichlet distribution-based approach. Using this more approach, the event of the user dialing a contact can be considered to be drawn from the categorical distribution, for which the conjugate prior under Bayes' theorem is the Dirichlet distribution. The conjugate prior can be set with equal weight on each item of contact information. The conjugate prior may then be updated with frequency counts, to produce an updated posterior distribution. The maximum likelihood value of this Dirichlet distribution then determines probability assigned to each contact.

Under the Dirichlet distribution-based approach, the probabilities may be scaled such that they sum to 1.0 for the user's entire contact list. In addition, some items of contact information may end up with a probability of zero, the resulting probability distribution can be mixed with a uniform distribution, with some small mixing factor. For example, if the weight vector is (0.5, 0.2, 0.2, 0.1, 0.0), it may be mixed with a uniform distribution (0.2, 0.2, 0.2, 0.2, 0.2) with probability 0.05. In this example, the resulting weight vector is (0.95*0.5+0.05*0.2, 0.95*0.2+0.05*0.2, 0.95*0.2+0.05*0.2, 0.95*0.1+0.05*0.2, 0.95*0.0+0.05*0.2), which is (0.485, 0.2, 0.2, 0.105, 0.01), leaving no items of contact information with zero probabilities.

A communication initiation grammar is generated (206). The communication initiation grammar may include one or more transitions associated with each of the items of contact information, where, for each of the items of contact information, the one or more transitions associated with the item of contact information are weighted according to the probability inferred for the item of contact information.

The communication initiation grammar may be specified in a GRammar eXtensible Markup Language (GRXML) file that is created by a service front end server, and may be sent to a recognizer server where it may be compiled into an efficient internal representation. This grammar may specify the weigh values of transitions using the 'weight' attribute on tags. The grammar may include of a start node, a set of "contact dial initiation" transitions (e.g. "call", "dial", etc.) with equal probability leading to an intermediate node, then a set of contact name transitions labeled with the name of each contact and the weight for each of those contacts. The weight values associated with each item of contact information are set to be equal to the estimated probability that the user will dial each contact. In doing so, the recognizer server is more likely to pick the correct contact, i.e. the contact that the user actually dialed, providing increased accuracy, a better user experience, and enhanced user retention.

Speech recognition is performed on the audio signal using the communication initiation grammar, to select a particular item of contact information (207). The communication is initiated using the selected item of contact information (209), thereby ending the process 200 (210).

Communication may be automatically initiated, or may be initiated "implicitly," if the affinity score or probability associated with the particular item of contact information indicates that it is highly probable that the user intended to initiate the communication using that particular item of contact information. A high probability may be established from a high affinity score, indicating that the user's intent is unambiguous, in either absolute or relative terms. Communication may be implicitly initiated if an item of contact information has an affinity score that is higher than a threshold value (e.g., thirty). As another example, communication may be implicitly initiated if the particular item of contact information has an affinity score that is at least N times (e.g., three times) that of the second highest affinity score.

In some examples, the communication may be immediately initiated by the client device when the particular item of contact information is identified to the client device. For example, the home telephone phone number for Bill may be dialed by a telephony application immediately upon receipt of the phone number from the server. In other examples, a countdown timer may be displayed on the client device 102, providing the user with an opportunity to trigger or cancel the initiation of the communication before the countdown timer reaches zero.

Furthermore, and contrasted with the implicit initiation of communication, an "explicit" user action may be required before communication is initiated. For example, upon receiving information identifying the particular item of contact information, the client device may display the particular item of contact information to the user, and request that the user confirm that they intend to initiate communication using the particular item of contact information before actually initiating communication. An affinity score associated with the particular item of contact information may be incremented if the user confirms that they intend to initiate communication using the particular item of contact information.

Figure 3:
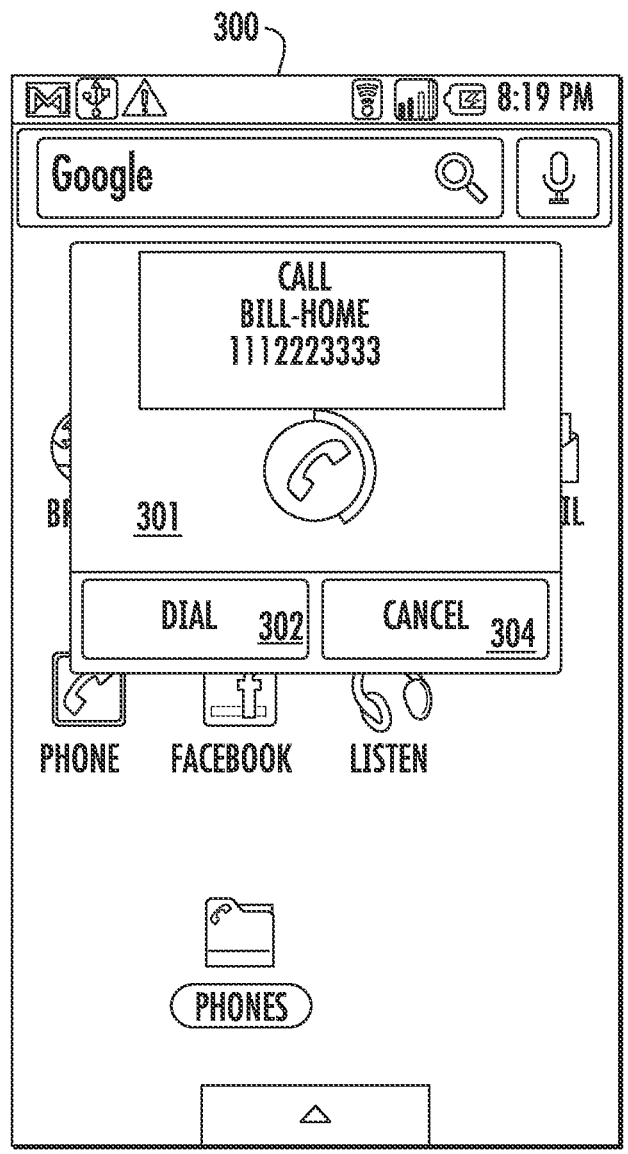
FIG. 3 shows an example user interface.

FIG. 3 illustrates an example user interface 300 that may be displayed, for example, on a mobile client device when the mobile device initiates a communication. For example, the user interface 300 may be displayed if contact information for "call Bill at home" is disambiguated from an utterance and is used to initiate a communication.

The user interface 300 may be displayed by a client device after receipt of a message by a server (e.g., FIG. 1, message 139, F) indicating to the client device is to initiate communication with selected contact information. The "call Bill at home" communication may be initiated immediately by the client device when the user interface 300 is displayed, or a "countdown timer" window 301 may be displayed on the user interface 300 before the "call Bill at home" communication is initiated. In some examples, the "call Bill at home" communication is initiated in response to the user selection of a "dial" control 302.

In other examples, the "countdown timer" window 301 may implement a timer where the user is presented with a countdown message indicating that the "call Bill at home" communication will be initiated when the countdown timer reaches zero. If the user intended to call Bill, the user may let the countdown timer reach zero, and at that point the call to Bill may be initiated. The user may also select the dial control 302 to initiate the call action before the timer reaches zero.

The amount of time that the countdown timer counts down may be based on an affinity score or probability associated with of a corresponding item of contact information. For example, if the affinity score or probability are high (e.g., above a predefined upper threshold), a countdown timer may not be used at all, or may begin counting down from a short duration (e.g., two seconds). If the affinity score or probability are in a mid-range (e.g., above a predefined lower threshold but below a predefined upper threshold), the countdown timer may begin counting down from a longer duration (e.g., four seconds). If the affinity score or the probability are low (e.g., below a predefined lower threshold), the countdown timer may begin counting down from a longer duration (e.g., eight seconds), or may require explicit confirmation from the user before initiating a communication.

The window 301 may also include a cancel control 304 to allow the user to cancel the "call Bill at home" communication before the call is placed or, for example, to terminate the call if the mobile device has dialed but is waiting for the contact phone to answer. If the user selects the cancel control 304 to cancel the call to Bill, an interrupt signal may be sent from the mobile client device to a server. In response to receiving the interrupt signal, the server may store information in the historical data to indicate that the "call Bill at home" communication was not completed, or to indicate that the "call Bill at home" communication was not the communication that the user intended.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
    receiving audio data encoding an utterance, and data specifying a time when the utterance was spoken;
    determining, for each of multiple communications that were initiated by a user of a mobile device, a time when the communication was initiated or received;
    determining, for each of the multiple communications, a similarity score based on a similarity between the time when the communication was initiated or received, and the time when the utterance was spoken;
    determining, for each of multiple contacts associated with the user, a probability associated with the contact based at least on the similarity score for the communications that were initiated or received;
    weighting a contact disambiguation grammar according to the probabilities; and
    processing the audio data using the contact disambiguation grammar to select a particular contact.

2. The method of claim 1, comprising:
    receiving a data specifying a date when the utterance was spoken;
    determining, for each of the multiple communications that were initiated by the user of the mobile device, a date when the communication was initiated or received; and
    wherein the respective similarity score is determined further based on a similarity between the date when the communication was initiated or received, and the date when the utterance was spoken.

3. The method of claim 1, comprising:
    receiving data specifying a location of the mobile device when the utterance was spoken;
    determining, for each of the multiple communications that were initiated by the user of the mobile device, a location of the mobile device when the communication was initiated or received; and
    wherein the respective similarity score is determined further based on a similarity between the location of the mobile device when communication was initiated or received, and the location of the mobile device when the utterance was spoken.

4. The method of claim 1, comprising:
    receiving data specifying a device type of a mobile device used to obtain the utterance;
    determining, for each of the multiple communications that were initiated by the user of the mobile device, a device type of the mobile device used to initiate or receive the communication; and
    wherein the respective similarity score is determined further based on a similarity between the device type of the mobile device used to initiate or receive the communication, and the device type or the mobile device used to obtain the utterance.

5. The method of claim 1, comprising:
    receiving data specifying a type of audio subsystem implemented by a mobile device used to obtain the utterance;
    determining, for each of the multiple communications that were initiated by the user of the mobile device, a type of audio subsystem implemented by the mobile device used to initiate or receive the communication; and
    wherein the respective similarity score is determined further based on a similarity between the type of audio subsystem implemented by the mobile device used to initiate or receive the communication, and the type of audio subsystem implemented by the mobile device used to obtain the utterance.

6. The method of claim 1, comprising:
    receiving data specifying whether the mobile device was docked or holstered when the utterance was spoken;
    determining, for each of the multiple communications that were initiated by the user of the mobile device, whether the mobile device was docked or holstered when the communication was initiated or received; and
    wherein the respective similarity score is determined further based on a similarity between whether the mobile device was docked or holstered when the communications were initiated or received, and whether the mobile device was docked or holstered when the utterance was spoken.

7. The method of claim 1, comprising:
    receiving data specifying whether the mobile device had access to a WiFi connection when the utterance was spoken;
    determining, for each of the multiple communications that were initiated by the user of the mobile device, whether the multiple device had access to a WiFi connection when the communication was initiated or received; and
    wherein the respective similarity score is determined further based on whether the mobile device had access to a WiFi connection when the communication was initiated or received, and whether the mobile device had access to a WiFi connection when the utterance was spoken.

8. A system comprising:
    one or more computers and one or more storage devices storing instructions that are operable, when executed by the one or more computers, to cause the one or more computers to perform operations comprising:
        receiving audio data encoding an utterance, and data specifying a time when the utterance was spoken;
        determining, for each of multiple communications that were initiated by a user of a mobile device, a time when the communication was initiated or received;
        determining, for each of the multiple communications, a similarity score based on a similarity between the time when the communication was initiated or received, and the time when the utterance was spoken;

determining, for each of multiple contacts associated with the user, a probability associated with the contact based at least on the similarity score for the communications that were initiated or received;

weighting a contact disambiguation grammar according to the probabilities; and processing the audio data using the contact disambiguation grammar to select a particular contact.

9. The system of claim 8, wherein the operations comprise:

receiving data specifying a date when the utterance was spoken;

determining, for each of the multiple communications that were initiated by the user of the mobile device, as date when the communication was initiated or received; and wherein the respective similarity score is determined further based on a similarity between the date when the communication was initiated or received, and the date when the utterance was spoken.

10. The system of claim 8, wherein the operations comprise:

receiving data specifying a location of the mobile device when the utterance was spoken;

determining, for each of the multiple communications that were initiated by the user of the mobile device, a location of the mobile device when the communication was initiated or received; and wherein the respective similarity score is determined further based on a similarity between the location of the mobile device when the communication was initiated or received, and the location of the mobile device when the utterance was spoken.

11. The system of claim 8, wherein the operations comprise:

receiving data specifying a device type of a mobile device used to obtain the utterance;

determining, for each of the multiple communications that were initiated by the user of the mobile device, a device type of the mobile device used to initiate or receive the communication; and wherein the respective similarity score is determined further based on a similarity between the device type of the mobile device used to initiate or receive the communication, and the device type of the mobile device used to obtain the utterance.

12. The system of claim 8, wherein the operation comprise:

receiving data specifying a type of audio subsystem implemented by a mobile device used to obtain the utterance;

determining, for each of the multiple communications that were initiated by the user of the mobile device, a type of audio subsystem implemented by the mobile device used to initiate or receive the communication; and wherein the respective similarity score is determined further based on a similarity between the type of audio subsystem implemented by the mobile device used to initiate or receive the communication, and the type of audio subsystem implemented by the mobile device used to obtain the utterance.

13. The system of claim 8, wherein the operations comprise:

receiving data specifying whether the mobile device was docked or holstered when the utterance was spoken;

determining, for each of the multiple communications that were initiated by the user of the mobile device, whether the mobile device was docked or holstered when the communication was initiated or received; and wherein the respective similarity score is determined further based on a similarity between whether the mobile device was docked or holstered when the communications were initiated or received, and whether the mobile device was decked or holstered when the utterance was spoken.

14. The system of claim 8, wherein the operations comprise:

receiving data specifying whether the mobile device had access to a WiFi connection when the utterance was spoken;

determining, for each of the multiple communications that were initiated by the user of the mobile device, whether the mobile device had access to a WiFi connection when the communication was initiated or received; and wherein the respective similarity score is determined further based on whether the mobile device had access to a WiFi connection when the communication was initiated or received, and whether the mobile device had access to a WiFi connection when the utterance was spoken.

15. A computer-readable storage device storing software comprising instructions executable by one or more computers which, upon such execution, cause the one or more computers to perform operations comprising:

receiving audio data encoding an utterance, and data specifying a time when the utterance was spoken;

determining, for each of multiple communications that were initiated by a user of a mobile device, a time when the communication was initiated or received;

determining, for each of the multiple communications, a similarity score based on a similarity between the time when the communication was initiated or received, and the time when the utterance was spoken;

determining, for each of multiple contacts associated with the user, a probability associated with the contact based at least on the similarity score for the communications that were initiated or received;

weighting a contact disambiguation grammar according to the probabilities; and processing the audio data using the contact disambiguation grammar to select a particular contact.

16. The device of claim 15, wherein the operations comprise:

receiving data specifying a date when the utterance was spoken;

determining, for each of the multiple communications that were initiated by the user of the mobile device, a date when the communication was initiated or received; and wherein the respective similarity score is determined further based on a similarity between the date when the communication was initiated or received, and the date when the utterance was spoken.

17. The device of claim 15, wherein the operations comprise:

receiving data specifying a location of the mobile device when the utterance was spoken;

determining, for each of the multiple communications that were initiated by the user of the mobile device, a location of the mobile device when the communication was initiated or received; and wherein the respective similarity score is determined further based on a similarity between the location of the mobile device when the communication was initiated or received, and the location of the mobile device when the utterance was spoken.

18. The device of claim 15, wherein the operations comprise:

receiving data specifying a device type of a mobile device used to obtain the utterance;

determining, for each of the multiple communications that were initiated by the user of the mobile device, a device type of the mobile device used to initiate or receive the communication; and wherein the respective similarity score is determined further used on a similarity between the device type of the mobile device used to initiate or receive the communication, and the device type of the mobile device used to obtain the utterance.

19. The device of claim 15, wherein the operations comprise:

receiving data specifying a type of audio subsystem implemented by a mobile device used to obtain the utterance;

determining, for each of the multiple communications that were initiated by the user of the mobile device, a type of audio subsystem implemented by the mobile device used to initiate or receive the communication; and wherein the respective similarity score is determined further based on a similarity between the type of audio subsystem implemented by the mobile device used to initiate or receive the communication, and the type of audio in subsystem implemented by the mobile device used to obtain the utterance.

20. The device of claim 15, wherein the operations comprise:

receiving data specifying whether the mobile device was docked or holstered when the utterance was spoken;

determining, for each of the multiple communications that were initiated by the user of the mobile device, whether the mobile device was docked or holstered when the communication was initiated or received; and wherein the respective similarity score is determined further based on a similarity between whether the mobile device was docked or holstered when the communications were initiated or received, and whether the mobile device was docked or holstered when the utterance was spoken.

* * * * *

UNITED STATES PATENT AND TRADEMARK OFFICE
CERTIFICATE OF CORRECTION

PATENT NO.        : 8,688,450 B2                                                    Page 1 of 1
APPLICATION NO.   : 13/545744
DATED             : April 1, 2014
INVENTOR(S)       : Matthew I. Lloyd and Willard Van Tuyl Rusch, II It is certified that error appears in the above-identified patent and that said Letters Patent is hereby corrected as shown below:

In the Claims

Column 21, line 15, in Claim 9, delete "as date" and insert -- a date -- therefor.

Column 23, line 8, in Claim 18, delete "used" and insert -- based -- therefor.

Signed and Sealed this
Sixteenth Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,688,450 B2
APPLICATION NO. : 13/545744
DATED : April 1, 2014
INVENTOR(S) : Lloyd et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 101 days.

Signed and Sealed this
Thirtieth Day of May, 2017

Michelle K. Lee
*Director of the United States Patent and Trademark Office*